Nov. 8, 1927.

H. L. BASSETT

SHOVEL HANDLE

Filed March 13, 1926

1,648,714

Inventor
HENRY LEE BASSETT,

By
Attorney

Patented Nov. 8, 1927.

1,648,714

UNITED STATES PATENT OFFICE.

HENRY LEE BASSETT, OF COLUMBUS, INDIANA.

SHOVEL HANDLE.

Application filed March 13, 1926. Serial No. 94,610.

The object of my invention is to produce a D-handle, suitable for use as a shovel handle, which handle will be provided with a hollow sheet-metal head having the appearance, balance, and other desirable features of a wooden D-handle. More specifically, it is the object of my invention to produce a sheet-metal head for a shovel handle, which head will be as desirable as other sheet-metal heads and more desirable than some, but will be much less costly to manufacture.

I accomplish the above objects by forming my handle head of two similar sheet-metal stampings whose meeting edges are substantially co-planar with the axis of the handle grip; and at points where such two stampings meet, I weld them together in order to form a complete hollow handle which will have substantially the appearance of solid metal.

Figure 1:
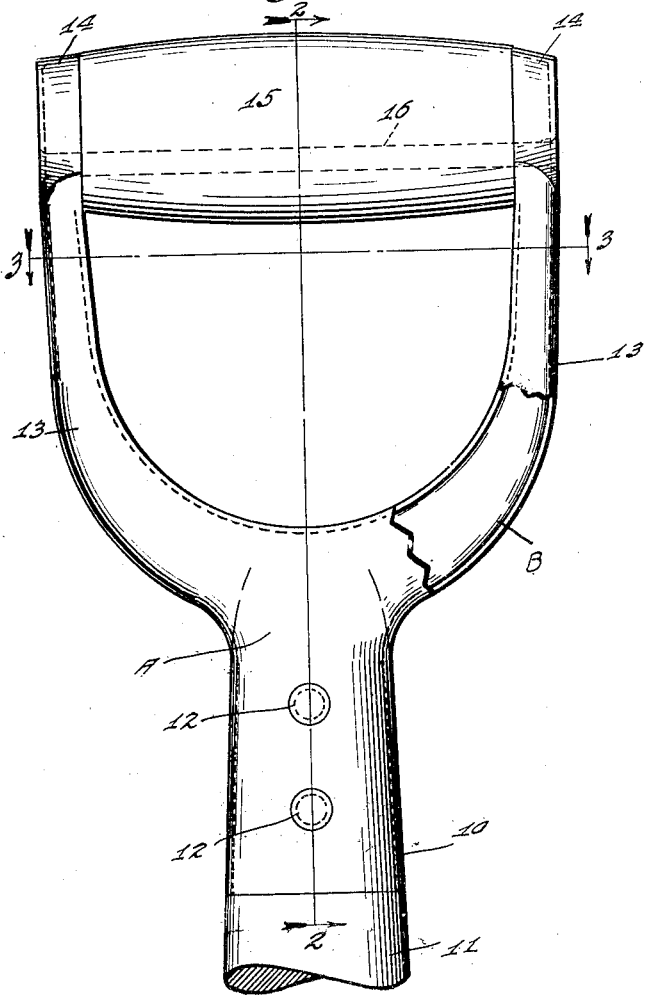
Figure 2:
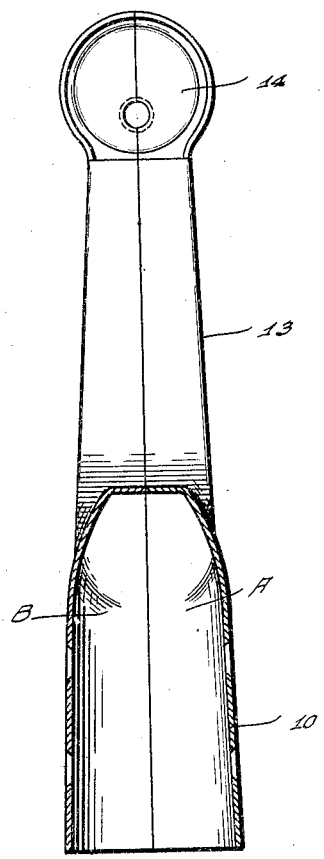
Figure 3:
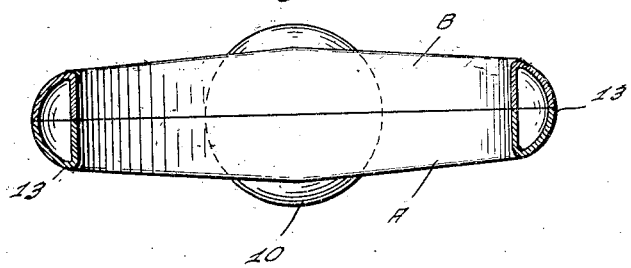

The accompanying drawing illustrates my invention: Fig. 1 is a front elevation of a handle embodying my invention with a portion of the head broken away; Fig. 2 is a longitudinal section on the line 2—2 of Fig. 1; and Fig. 3 is a transverse section on the line 3—3 of Fig. 1.

My handle-head, when complete, comprises a stale-socket 10 adapted to receive the stale 11 and to be fastened thereto as by means of one or more rivets 12. The stale-socket is conveniently tapered, as indicated in the drawings. From the upper end of the stale-socket two arms 13 extend outwardly and upwardly, such arms being provided at their upper ends with opposed sockets 14 for the reception of the handle-grip 15 which is preferably of wood. The grip 15 is held in place in the grip sockets 14 by means of a rivet 16 which passes longitudinally through the grip preferably on a line spaced from the center of the grip-sockets 14 in order that the rivet may prevent turning of the grip in the grip sockets.

The arms 13 are hollow arms, are D-shaped in cross-section, and taper gradually in both width and thickness throughout their length, the arms being thickest and widest when they join the stale-socket, as is clear from the drawing. The metal forming the inside of the arms is curved continuously across the end of the stale-socket in order completely to close the socket and to present a pleasing appearance in the finished handle.

I form the sheet-metal handle head above described from two sheet-metal stampings A and B which are preferably exactly similar in order that any two of them may form a complete head. The sections A and B meet each other in the longitudinal plane through the axis of the grip 15 and at their meeting edges are welded in order to hold them together. The welding need not be continuous throughout the length of the meeting edges of the two head-halves A and B. I have found it convenient to weld the two sections A and B together at the sides of the stale socket and across the outer faces of the grip sockets. The welding at the grip sockets may be continued along the outside of each of the arms 13 to the point where the outer surfaces of such arms begin to curve inwardly to meet the stale-sockets.

Each half of the handle-head comprises one-half of the stale socket 10, one-half of each of the arms 13, and one-half of each of the grip sockets 14. Hollow sheet-metal heads for shovel handles have been made before, as I am aware, but prior methods of manufacture have either failed to produce a handle having the appearance of a solid head or have been costly to carry out.

Such a handle as I have described has the pleasing appearance of a solid handle. It is fully adequate in strength to sustain the forces to which it is subject in use, and as it is hollow it is not excessively heavy.

I claim as my invention:

1. A hollow sheet-metal D-handle head, comprising a stale-socket adapted to receive a stale, said stale socket having a closed end, two curved tubular arms extending from the closed end of said socket, said arms being provided with opposed grip sockets, said head being formed of two sheet-metal stampings whose meeting edges are located substantially in that longitudinal plane of the head which contains the centers of the grip-sockets, said two stampings being welded together.

2. A hollow sheet-metal D-handle head, comprising a stale-socket adapted to receive a stale, said stale socket having a closed end, two curved tubular arms extending from the closed end of said socket, said arms being provided with opposed grip sockets, said head being formed of two sheet-metal stampings whose meeting edges are located substantially in that longitudinal plane of the head which contains the centers of the grip-sockets.

3. A hollow sheet-metal head for a D-handle, said head comprising a stale socket and two tubular arms, and opposed grip sockets on said arms, said head being formed of two similar sheet-metal stampings which meet substantially in that longitudinal plane of the head which contains the center of said grip sockets.

In witness whereof, I have hereunto set my hand at Indianapolis, Indiana, this eleventh day of March, A. D. one thousand nine hundred and twenty-six.

HENRY LEE BASSETT.